United States Patent
Schürmann et al.

(10) Patent No.: US 11,753,011 B2
(45) Date of Patent: Sep. 12, 2023

(54) METHOD FOR DETERMINING A USER-SPECIFIC CONFIGURATION OF A BRAKING DEVICE, AND A MOTOR VEHICLE, AND A COMPUTER-READABLE STORAGE MEDIUM

(71) Applicant: Audi AG, Ingolstadt (DE)

(72) Inventors: Lorenzo Schürmann, Ingolstadt (DE); Felix Wittmann, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 17/632,680

(22) PCT Filed: Jul. 16, 2020

(86) PCT No.: PCT/EP2020/070179
§ 371 (c)(1),
(2) Date: Feb. 3, 2022

(87) PCT Pub. No.: WO2021/028148
PCT Pub. Date: Feb. 18, 2021

(65) Prior Publication Data
US 2022/0281454 A1    Sep. 8, 2022

(30) Foreign Application Priority Data
Aug. 13, 2019    (DE) ............... 10 2019 212 076.8

(51) Int. Cl.
*B60W 30/18*    (2012.01)
*B60W 40/09*    (2012.01)
*B60W 50/10*    (2012.01)

(52) U.S. Cl.
CPC ...... *B60W 30/18109* (2013.01); *B60W 40/09* (2013.01); *B60W 50/10* (2013.01); *B60W 2510/182* (2013.01); *B60W 2510/184* (2013.01)

(58) Field of Classification Search
CPC ........... B60W 30/18109; B60W 40/09; B60W 50/10; B60W 2510/182; B60W 2510/184
(Continued)

(56) References Cited

U.S. PATENT DOCUMENTS

| | | |
|---|---|---|
| 6,680,672 B2 | 1/2004 | Borugian |
| 10,800,392 B2 | 10/2020 | Alam et al. |

(Continued)

FOREIGN PATENT DOCUMENTS

| | | |
|---|---|---|
| AT | 507033 A1 | 1/2010 |
| CN | 102815291 A | 12/2012 |

(Continued)

OTHER PUBLICATIONS

International Search Report and Written Opinion of the International Searching Authority directed to related International Patent Application No. PCT/EP2020/070179, dated Sep. 30, 2020, with attached English-language translation; 16 pages.

(Continued)

*Primary Examiner* — Isaac G Smith
(74) *Attorney, Agent, or Firm* — Sterne, Kessler, Goldstein & Fox P.L.L.C.

(57) ABSTRACT

The present disclosure relates to a method for determining a user-specific configuration of a braking device of a motor vehicle, the method including detecting measurement data using a detector and providing a data record to an evaluation circuitry. Based on the measurement data and data record, a user-specific braking profile is determined. Furthermore, a selected braking profile that has the greatest degree of conformity with the user-specific braking profile is identified from a plurality of braking profiles. A corresponding configuration associated with the selected braking profile is identified as the suitable user-specific configuration. A (Continued)

changeover operation is triggered in order to provide the user-specific configuration in the motor vehicle.

10 Claims, 2 Drawing Sheets

(58) Field of Classification Search
USPC .......................................................... 701/70
See application file for complete search history.

(56) References Cited

U.S. PATENT DOCUMENTS

| | | |
|---|---|---|
| 2013/0124009 A1 | 5/2013 | Esler |
| 2013/0325541 A1 | 12/2013 | Capriotti et al. |
| 2015/0228129 A1 | 8/2015 | Cox et al. |
| 2015/0235485 A1 | 8/2015 | Nemat-Nasser et al. |
| 2016/0144865 A1 | 5/2016 | Stadler |
| 2016/0163130 A1 | 6/2016 | Zagajac et al. |
| 2017/0217419 A1 | 8/2017 | Yen et al. |
| 2018/0096542 A1 | 4/2018 | Mader et al. |
| 2018/0141526 A1* | 5/2018 | Li ........................ B60T 8/172 |
| 2019/0100191 A1 | 4/2019 | Kikkawa |
| 2021/0086733 A1 | 3/2021 | Gadke et al. |

FOREIGN PATENT DOCUMENTS

| | | |
|---|---|---|
| CN | 103106065 A | 5/2013 |
| CN | 105339225 A | 2/2016 |
| CN | 108725417 A | 11/2018 |
| DE | 102005048534 A1 | 4/2007 |
| DE | 102015120991 A1 | 6/2016 |
| DE | 102016006541 A1 | 11/2017 |
| DE | 102016117831 A1 | 3/2018 |
| WO | WO 2019/020301 A1 | 1/2019 |

OTHER PUBLICATIONS

Eichhorn, Ulrich, et al.: "Fahrzeugtechnische Anforderungen," (2012) In: Breuer B., Bill K. (eds) Bremsenhandbuch. ATZ/MTZ-Fachbuch. Vieweg+Teubner Verlag, Wiesbaden; available at: https://link.springer.com/chapter/10.1007%2F978-3-8348-2225-3_3; with attached English language translation; 53 pages.

International Preliminary Report on Patentability directed to related International Patent Application No. PCT/EP2020/070179, completed Jan. 27, 2021, with attached English-language translation; 11 pages.

* cited by examiner

METHOD FOR DETERMINING A USER-SPECIFIC CONFIGURATION OF A BRAKING DEVICE, AND A MOTOR VEHICLE, AND A COMPUTER-READABLE STORAGE MEDIUM

TECHNICAL FIELD

The present disclosure relates to a method for determining a user-specific configuration of a braking device of a motor vehicle. The present disclosure also relates to a motor vehicle and to a computer-readable storage medium for this purpose.

BRIEF SUMMARY

When purchasing a motor vehicle, the motor vehicle has a current configuration of a braking device, wherein the configuration is given by an embodiment of at least one mechanical component and/or a combination of a plurality of mechanical components of the braking device. The configuration thus corresponds to the at least one component of the braking device in the motor vehicle, which component is physically actually present. The at least one component can be a brake lining, for example. During the operation of the motor vehicle by a vehicle driver, i.e. a user of the motor vehicle, the braking device is stressed, i.e. used, in a user-specific manner.

In this context, US 2013/0325541 A1 describes a method for managing vehicle maintenance information, the vehicle maintenance information being used to alert and instruct a vehicle owner and a vehicle service provider about recommended maintenance planning, specific vehicle parts, and repair requirements. A specific driving behavior of the vehicle user, such as frequent and heavy braking, can trigger a maintenance planning alarm from the vehicle service provider to the vehicle user, wherein the maintenance planning alarm can comprise a warning message about brake maintenance and special offers for brake linings.

US 2017/0217419 A1 describes a device for analyzing a vehicle braking system. The device is set up to determine the presence of a problem based on received data and to output a recommended measure. The data can comprise sensor data (brake pedal force/displacement, brake line pressure, vehicle acceleration/wheel speed) and context data (road surface, vehicle height, weather). For example, the problem can relate to an alignment and/or a temperature of a brake lining. Using the analyzed vehicle braking system, a vehicle manufacturer can create or modify a design of a braking system or one or more braking system components in order to avoid or mitigate the problem with respect to an affected vehicle and/or applicable vehicles.

Furthermore, US 2015/0228129 A1 discloses a method and a system for profiling vehicle usage of a vehicle for optimizing a route selection, for creating profiles of drivers and the vehicle and for providing associated services for the vehicle. In this case, a specific behavior of the driver and a modification of the specific behavior can be determined on the basis of vehicle-side diagnostic data in order to improve or change a vehicle metric.

DETAILED DESCRIPTION

The object of the present disclosure is to evaluate a current configuration of the braking device based on a user-specific use of a motor vehicle.

The object is achieved by the subject matter of the independent claims. Advantageous aspects of the present disclosure are described by the dependent claims, the subsequent description, and the drawings.

The present disclosure provides a method for determining a user-specific configuration of a braking device of a motor vehicle. The configuration is predetermined by an embodiment of at least one mechanical component, for example a geometry and/or a material and/or component type of the at least one component. As an alternative or in addition, the configuration is given by a combination of several mechanical components, which can be, for example, a brake disc and brake linings that are matched thereto. To determine the user-specific configuration, i.e. that configuration tailored to a user, i.e. a driver of the motor vehicle, a user-specific braking profile is determined in particular using measurement data that describe a user-specific use of the current (actually installed) configuration. The user-specific braking profile is compared with possible braking profiles on the basis of which the suitable user-specific configuration is determined, which is provided in the motor vehicle by means of a triggered changeover operation.

Measurement data are detected by a detection unit of the motor vehicle, with a user-specific use of the braking device of the motor vehicle having the current configuration being described on the basis of the measurement data. In other words, the measurement data are detected by a measurement by the detection unit, for example a sensor unit of the motor vehicle. The measurement data can be, for example, at least one temperature value and/or at least one pressure value, the temperature value being able to be determined by a temperature sensor arranged in a vicinity of the braking device, and/or the pressure value being able to be determined by a pressure sensor of a brake line of the braking device. The detected measurement data characterize the user-specific use, in particular a user-specific load, of the current configuration of the braking device. The user-specific use can, for example, characterize a sporty and/or moderate driving behavior and the resulting braking behavior of the vehicle driver. A data record, which comprises the measurement data and identification data for identifying the current configuration of the braking device, is provided for an evaluation unit. In other words, the data record, including the measurement data and the identification data characterizing the current configuration, are transmitted together to the evaluation unit. The identification data can be, for example, a work number of the at least one component of the braking device. The current configuration can, for example, describe a feature of the braking device that was selected by the user before purchasing the motor vehicle. In this context, the evaluation unit can be implemented as an evaluation unit of the motor vehicle and/or an external server unit connected to the motor vehicle.

Based on the data record provided, the user-specific braking profile is determined and provided by the evaluation unit. In other words, the user-specific braking profile is identified on the basis of the data record provided and, in particular, made available for subsequent data evaluation.

For example, the user-specific braking profile comprises a correlation, i.e. a relationship between different measured values of the detected measurement data, such as a relationship between the temperature value and the pressure value.

In addition, possible braking profiles are provided for the evaluation unit, of which each braking profile is associated to a corresponding alternative configuration of the braking device, as can be selected in the motor vehicle. In other words, the corresponding alternative configuration of the braking device can be selected for the motor vehicle having the current configuration, the corresponding alternative configuration being dependent on each of the possible braking profiles. In particular, the corresponding alternative configuration differs from the current configuration of the braking device. For example, in the current configuration, the brake disc has a first diameter and, in a corresponding alternative configuration, has a diameter that deviates from the first diameter.

The possible braking profile which has the greatest degree of conformity with the user-specific braking profile is recognized by the evaluation unit and an associated configuration is identified as the user-specific configuration. In other words, the possible braking profiles are compared with the user-specific braking profile and it is determined which braking profile of the possible braking profiles has the greatest possible correspondence with the user-specific braking profile. The agreement is described by the degree of conformity, which can be a percentage value, for example. The possible braking profile with the greatest agreement is identified as the user-specific configuration. For example, the possible braking profile can be a sport braking profile, with the user-specific configuration being able to be matched in particular to the identified sporty driving behavior of the vehicle driver.

To provide the user-specific configuration in the motor vehicle, the changeover operation is triggered by the evaluation unit. In other words, the changeover operation is initiated in order to implement the user-specific configuration in the motor vehicle. For example, during a repair and/or maintenance appointment, the at least one component can be replaced with a different component, wherein, for example, the design of the different component can correspond to the user-specific configuration.

This results in the advantage that the current configuration can be evaluated on the basis of a detected user-specific use of the braking device and can be replaced by the user-specific configuration. As a result, the braking device can be adapted and/or changed, whereby in particular the service life of the braking device can be increased and/or safe operation of the braking device can be provided, in particular during a braking process. As a result, overheating and/or excessive wear of the braking device or of the at least one component and/or of the multiple components can be reduced. In this context, a decrease in the braking effect due to strong thermal stress (brake fading) can be prevented. In this way, a user-specific upgrade of the braking device can be implemented.

The present disclosure is based on the knowledge that the user-specific use of the braking device is insufficiently documented and/or provided during the operation of the motor vehicle. As a result, this is not taken into account, for example, when the at least one mechanical component is replaced. Furthermore, the user-specific use for the vehicle driver, for example the sporty driving behavior, can be hidden and can be left out when the vehicle is used in the future.

The present disclosure also comprises embodiments which yield additional advantages.

One embodiment provides that a change of the at least one component is initiated by means of the changeover operation, wherein an intervention in an operation of the motor vehicle and/or a query for providing the at least one component is carried out prior to the change. In other words, the at least one component is replaced, i.e. exchanged, by a different component. The operation of the motor vehicle is intervened in advance, i.e. it is controlled in particular by the evaluation unit, and, as an alternative or in addition, for example, the availability of the at least one component is determined. When performing the intervention in operation, at least one control parameter is adapted and/or at least one component of the motor vehicle is deactivated. This means that the control parameter is changed and, for example, the brake pressure can be regulated on the basis of the adapted control parameter. This results in the advantage that the driving behavior of the vehicle driver can be influenced, i.e. changed, by the adapted control parameter, so that the braking profile has a greater correspondence with a braking profile predetermined by the current configuration. As an alternative or in addition, the at least one component of the motor vehicle is deactivated, i.e. switched off. For example, further operation and/or start-up of the motor vehicle can be controlled by deactivating, in particular, an engine and/or the braking device as a component of the motor vehicle. It is advantageous that, in particular when the braking device overheats, further load on the braking device can be controlled and/or prevented in order to provide safe operation of the motor vehicle. In connection with the query carried out to provide the at least one component, the availability of the at least one component is determined, i.e. a query is sent to a manufacturer and/or a dealer of the at least one component. In other words, it is learned that the at least one component can be made available by the manufacturer and/or the dealer. For example, the evaluation unit can transmit the query to the manufacturer and/or the dealer via a communication link, the manufacturer and/or the dealer being able to use a database to check an inventory of the at least one component and being able to possibly initiate a production and/or an order for the at least one component. It is advantageous that the availability of the at least one component can be determined promptly, in particular, and a countermeasure can be initiated in the event of a lack of availability.

Another embodiment provides that, in connection with the changeover operation, output content is output to the user of the motor vehicle by an output unit. The output content characterizes the determined braking profile and the recommended user-specific configuration of the braking device. In other words, the determined braking profile and the user-specific configuration of the braking device are displayed to the user on the basis of the output content. The output unit is integrated in the motor vehicle and/or part of a mobile terminal. This means that the output unit is arranged in the motor vehicle and/or in the mobile terminal. The output unit can be designed, for example, as a screen and/or a loudspeaker and can be provided in an infotainment system of the motor vehicle. As an alternative or in addition, the screen and/or the loudspeaker can be built into a smartphone of the user. User input is detected in response to the output of the output content. In other words, a user input following the output of the output content is determined. The user input can be, for example, a detected touch of the user, which is detected by the touch-sensitive screen of the motor vehicle and/or the smartphone. As an alternative or in addition, the user input can comprise a received voice command from the user. Through the user input, for example, a purchase of the at least one component, the design of which corresponds to the user-specific configuration, can be completed and/or an appointment for replacing the at least one component can be confirmed. It is advantageous that the user can be informed about the user-specific use of the braking device and receive a resulting upgrade recommendation. Furthermore, the output of the display content can be confirmed by the user by means of the detected user input.

A further embodiment provides that the corresponding configuration of the braking device results in a thermal stress on the braking device that is characteristic of the corresponding braking profile, and in order to reduce a current thermal stress on the braking device, the current configuration is exchanged for the user-specific configuration by the triggered changeover operation. In other words, there is a characteristic thermal stress on the braking device based on the corresponding braking profile, the corresponding braking profile being associated to the corresponding configuration. In order to reduce a current thermal stress on the braking device, the current configuration is replaced by the user-specific configuration of the braking device. For example, a sports brake profile indicates a thermal stress on the braking device that is typical for sporty driving behavior, and a standard braking profile indicates a thermal stress that is typical for moderate driving behavior. If the sporty driving behavior is identified on the basis of the user-specific use, the current configuration of the braking device having a configuration adapted to the moderate driving behavior, then the current thermal stress can be reduced by changing to the user-specific configuration, i.e. a configuration suitable for the sporty driving behavior. This results in the advantage that, through the changeover operation, the current thermal stress on the braking device can be reduced based on the user-specific use and excessive thermal stress on the braking device can be prevented.

Another embodiment provides that, when detecting the measurement data, at least two physical measured variables are detected, a current characteristic curve of the at least two measured variables being generated when determining the user-specific braking profile, through which measured variables at least one overheating event is identified. In other words, at least two physical measured variables are measured by means of the detection unit and taken into account in the user-specific braking profile, the current characteristic curve of the at least two measured variables describing a relationship between the at least two measured variables. At least one overheating event can be identified based on the current characteristic curve. For example, the current characteristic curve can be compared with a stored characteristic curve, the at least one overheating event being able to be identified if the stored characteristic curve is exceeded by the current characteristic curve. The at least two physical measured variables are, in particular, the temperature value and/or the pressure value as a first measured variable and a time unit as a second measured variable. For example, the current characteristic curve can be determined on the basis of a time profile of a temperature and/or a pressure. This has the advantage that the at least one overheating event of the braking device can be easily identified on the basis of the current characteristic curve and appropriate countermeasures can be taken to protect against overheating.

A further embodiment provides that, when detecting the measurement data, a curvature and/or a gradient of a road section being driven on is detected, wherein a characteristic of the lane section influencing the user-specific use of the braking device is determined based on the curvature and/or the gradient and is provided as part of the braking profile. In other words, in connection with the detection of the measurement data, the detection unit additionally detects the curvature, i.e. at least one change in angle of the roadway section in relation to a length of the lane section, and as an alternative or in addition the gradient, i.e. a steepness of the roadway section. The curvature and/or the gradient describe the characteristics of the lane section and are transmitted as part of the braking profile when the braking profile is provided. For example, the characteristics of the lane section can be used to identify whether the motor vehicle is being operated on a racetrack or a mountain road. This has the advantage that the characteristics of the lane section can be determined without the transmission of location-related and/or personal data.

Another embodiment provides that the evaluation unit comprises an internal evaluation means of the motor vehicle and/or an external evaluation unit of a server unit connected to the motor vehicle. In particular, the server unit is a server unit of a vehicle manufacturer and/or a vehicle component manufacturer. In other words, the evaluation unit can have the internal and/or the external evaluation means, the internal evaluation unit being integrated into the motor vehicle and the external evaluation unit being part of the server unit. The server unit is connected to the motor vehicle by means of a communication connection for transmitting data and/or profiles and can be associated to the vehicle manufacturer, i.e. a manufacturer of the motor vehicle and/or a distributor of a vehicle brand, and as an alternative or in addition, the vehicle component manufacturer such as a supplier of the braking device and/or of the at least one component of the braking device. In this context, when providing the data record and/or the user-specific braking profile for the external evaluation means, user-related data of a corresponding user of the motor vehicle are transmitted in pseudonymized and/or anonymized form. In other words, user-related data are replaced by a pseudonym and/or changed in such a way that an association to the user of the motor vehicle is made difficult and/or prevented before the data record and/or the corresponding braking profile is/are transmitted. This results in the advantage that data protection requirements are met and yet measurement data valuable for development can be provided as raw data and/or their correlation for the vehicle manufacturer and/or the vehicle component manufacturer.

The present disclosure provides a motor vehicle having a braking device for a method for determining a user-specific configuration of a braking device of the motor vehicle. In this case, a corresponding configuration of the braking device is set up to specify a configuration of a brake disc and/or a brake lining of the braking device. In other words, a geometry and/or a material of the brake disc and/or the brake lining is specified on the basis of the corresponding configuration. In particular, this can be a diameter of the brake disc. This results in the advantage that a user-specific driving behavior, on the basis of which a corresponding braking profile is determined, to which the corresponding configuration is associated, can be determined particularly advantageously for the design of the brake disc and/or the brake lining.

One embodiment provides for this purpose that the corresponding configuration of the brake disc provides a diameter and/or ventilation and/or air supply for regulating thermal stress. In other words, the corresponding configuration of the brake disc determines its heat regulation, which can be implemented by specifying the diameter and/or the ventilation and/or the air supply. When specifying the diameter, there is the advantage that by increasing the diameter of the brake disc, heat can be efficiently dissipated due to a larger mass of the brake disc and, furthermore, a braking effect can be increased, in particular in the case when the motor vehicle is powerfully engineered and/or in the case of use for a racetrack. For example, the ventilation of the brake disc comprises internal ventilation and/or external ventilation by means of radial cooling openings which are arranged between two friction surfaces. This results in the advantage that, due to a draft of air generated by means of cooling ducts, heat can be transported away in a particularly advantageous manner and a heat absorption capacity of the brake disc can be increased. The air supply can supply additional cooling air to the brake disc in particular through air baffles and/or air inlet funnels and/or spoiler openings. This results in the advantage that cool airflow can be conducted to the braking device in order to additionally cool it and to prevent deformation, such as shielding the brake disc. As an alternative or in addition, the heat regulation can comprise a heat treatment of the brake disc.

The motor vehicle according to the present disclosure is preferably designed as a motor vehicle, in particular as a passenger vehicle or as a truck, or as a passenger bus or as a motorcycle.

The present disclosure also includes further embodiments of the motor vehicle according to the present disclosure, which have features such as those previously described in connection with the further embodiments of the method according to the present disclosure. For this reason, the corresponding refinements of the method according to the present disclosure are not described again herein.

The present disclosure provides a computer-readable storage medium, the computer-readable storage medium comprising instructions which, when carried out by a processor device, cause the processor unit to carry out the method for determining a user-specific configuration of a braking device of a motor vehicle. For this purpose, the processor unit can have at least one microprocessor and/or at least one microcontroller and/or at least one FPGA (Field Programmable Gate Array) and/or at least one DSP (Digital Signal Processor). The commands can be control commands for a detection unit for detecting measurement data, for a storage unit for providing possible braking profiles, and for an evaluation unit, the evaluation unit being set up to determine a user-specific braking profile, to compare this with the possible brake profiles, identify the user-specific configuration and trigger a changeover operation. In particular, the computer-readable storage medium can be part of the processor unit and/or the storage unit. In this context, the processor unit can be arranged in the motor vehicle and/or a server unit connected to the motor vehicle and coupled, i.e. connected, to the detection unit, the storage unit, and the evaluation unit.

The present disclosure also includes further embodiments of the computer-readable storage medium according to the present disclosure, which have features such as those previously described in connection with the further embodiments of the method according to the present disclosure and of the method according to the present disclosure. For this reason, the corresponding further developments of the method according to the present disclosure and the motor vehicle according to the present disclosure are not described again here.

The present disclosure also comprises the combinations of the features of the described embodiments.

Embodiments of the present disclosure are described below.

The embodiments explained below are preferred embodiments of the present disclosure. In the embodiments, the described components of the embodiments each represent individual features of the present disclosure which are to be considered to be independent of one another and which each further develop the present disclosure independently of one another. Therefore, the disclosure shall also comprise combinations of the features of the embodiments other than the ones presented. Furthermore, the described embodiments may also be supplemented by further features of the present disclosure as already described.

In the figures, the same reference signs refer to functionally identical elements.

Figure 1:
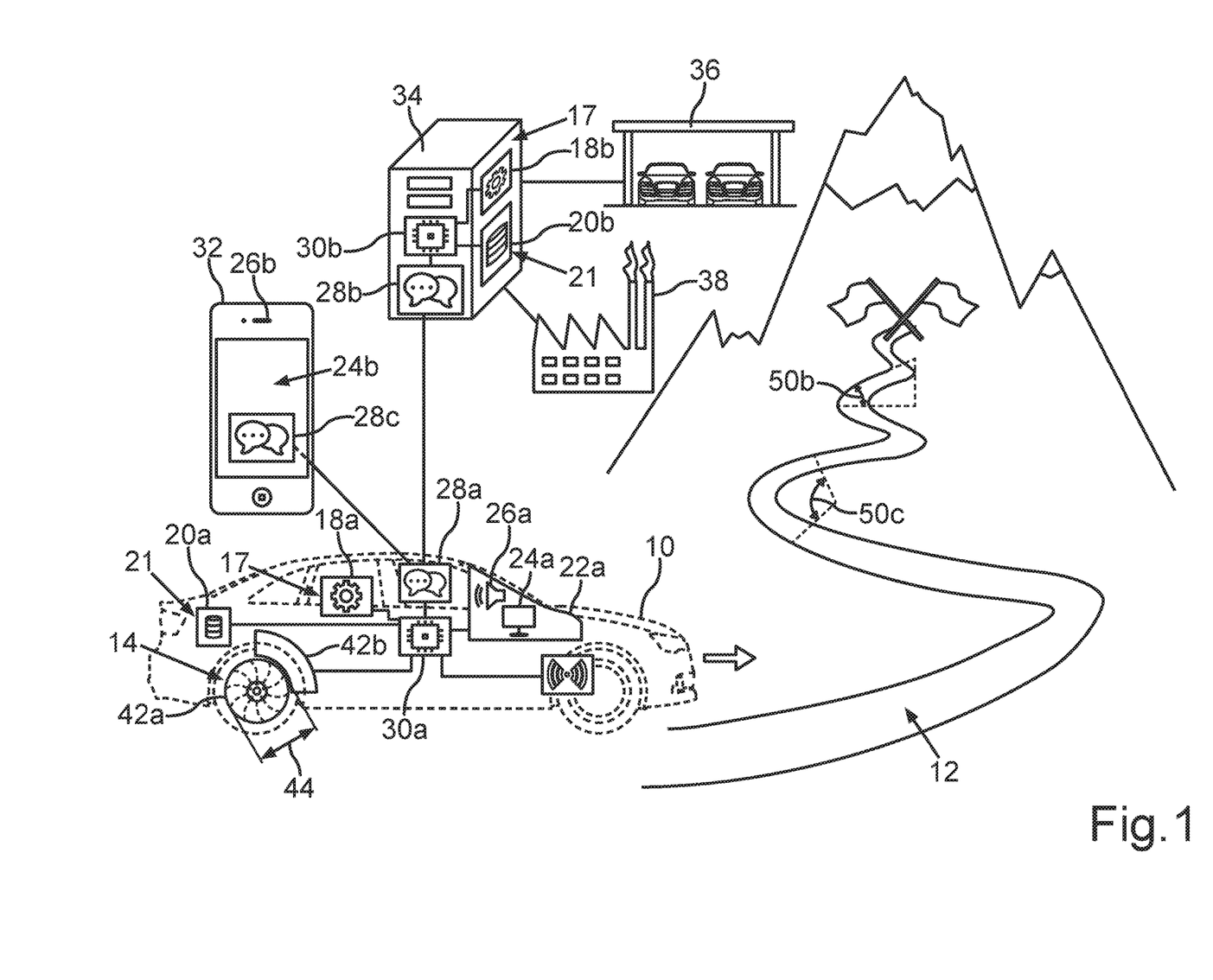
FIG. 1 is a representation of a motor vehicle driving on a lane section of a mountain road.

The embodiment shown in FIG. 1 can be based on the following situation by way of example. A vehicle driver sits in a motor vehicle 10 and drives the motor vehicle 10 along a lane section 12 of a winding and steep mountain road. The motor vehicle 10 can comprise a braking device 14, a detection unit 16, an evaluation unit 17 with an internal evaluation means 18a, a storage unit 20a, an output unit 22a having a screen 24a, and a loudspeaker 26a, and a communication unit 28a. To control the braking device 14 and the corresponding units 16, 17, 20a, 22a, 28a of the motor vehicle 10, commands can be carried out by a processor unit 30a, the commands being able to be stored in a computer-readable storage medium 21 designed as a storage unit 20a, and the processor unit 30a being able to be coupled, i.e. connected, to the braking device 14 and corresponding devices 16, 17, 20a, 22a, 28a. Using the communication unit 28a of the motor vehicle 10, corresponding communication connections can be established with a communication unit 28c of a mobile terminal 32 and, as an alternative or in addition, with a communication unit 28b of an external server unit 34, wherein the server unit 34 can be associated to a vehicle manufacturer 36 and/or a vehicle component manufacturer 38. The server unit 34 can comprise an external evaluation means 18b of the evaluation unit 17, a storage unit 20b, and the communication unit 28a, which can be controlled by means of a central processor unit 30b. As an alternative or in addition, the computer-readable storage medium 21 can also be designed as the storage unit 20b of the server unit 34. As an alternative or in addition, the computer-readable storage medium 21 can also be integrated into one or both processor units 30a, 30b.

The braking device 14 of the motor vehicle 10 can have a current configuration 40, in which there is an embodiment of at least one mechanical component 42a, 42b and/or a combination of a plurality of mechanical components 42a, 42b of the braking device 14. For example, the at least one mechanical component 42a, 42b can comprise a brake disc 42a with a diameter 44 and associated brake linings 42b.

When driving on the lane section 12, measurement data 46 are detected by the detection unit 16, for example by means of a measurement sensor of the motor vehicle 10. Using the measurement data 46, a user-specific use of the braking device 14 having the current configuration 40 can be described. The measurement data 46 can detect at least 2 physical measurement variables 48a, 48b, in particular a temperature value and/or a pressure value as a first measurement variable 48a and a time unit as a second measurement variable 48b. As an alternative or in addition, a curvature 50a and/or a gradient 50b of the lane section 12 being driven on can be detected as measurement data 46 by means of the detection unit 16.

The measurement data 46 and identification data 53 for identifying the current configuration 40 of the braking device 14 for the evaluation unit 17 can be provided in a data record 52. Based on the data record 52 provided, a user-specific braking profile 54 can be determined and made available by means of the evaluation unit 17. In particular, when determining the user-specific braking profile 54, a current characteristic curve 56 of the at least two measured variables 48a, 48b can be generated, on the basis of which at least one overheating event 58 can be identified. As an alternative or in addition, a characteristic of the lane section 12 influencing the user-specific use of the braking device 14 can be determined based on the curvature 50a and/or the gradient 50b and provided as part of the braking profile 54.

To determine a user-specific configuration 60, possible braking profiles 62a, 62b, for example from the storage unit 20a, 20b, can be provided for the evaluation unit 17, of which each braking profile 62a, 62b can be associated to a corresponding alternative configuration 64a, 64b of the braking device 14. In this context, the corresponding alternative configuration 64a, 64b in the motor vehicle 10 can be selected. Then the possible braking profile 62a can be recognized by means of the evaluation unit 17 which has the greatest degree of conformity 66 with the user-specific braking profile 54 and the associated configuration 64a can be identified as the user-specific configuration 60. A changeover operation can be triggered by means of the evaluation unit 17 in order to provide the user-specific configuration 60 in the motor vehicle 10. In this case, the at least one component 42a, 42b can be changed by means of the changeover operation, wherein at least one control parameter, for example a brake pressure, is adapted and/or at least one component of the motor vehicle 10, for example, an engine and/or the braking device 14 is able to be deactivated prior to the change an intervention 68 into an operation of the motor vehicle 10. As an alternative or in addition, a query 70 for providing the at least one component 42a, 42b can be carried out, wherein a query about the availability of the at least one component is sent to a manufacturer such as the vehicle manufacturer 36 and/or a dealer of the at least one component 42a, 42b.

In connection with the changeover operation, an output content 72 can be output to a user of the motor vehicle 10, i.e. the vehicle driver, by means of the output unit 22a, which is integrated in the motor vehicle 10 and has the screen 24a and the loudspeaker 26b. As an alternative or in addition, the output content 72 can be output by means of an output unit 22b, which is part of the mobile terminal 32 and can comprise a screen 24b and a loudspeaker 26b. The output content 72 can characterize the user-specific braking profile 54 and the user-specific configuration 60 of the braking device 14 recommended therefrom. In response to the output of the output content 72, a user input 74, for example to confirm a change of the at least one component 42a, 42b, can be detected.

The corresponding configuration 40, 60, 64a, 64b of the braking device 14 can be set up to predefine the configuration of the brake disc 42a and/or the brake lining 42b of the braking device 14. The corresponding configuration 40, 60, 64a, 64b of the braking device 14 can result in a thermal stress on the braking device 14 that is characteristic of the corresponding braking profile 54, 62a, 62b. In order to reduce a current thermal stress on the braking device 14, the current configuration 40 can be exchanged for the user-specific configuration 60 by means of the triggered changeover operation. In particular, the corresponding configuration 40, 60, 64a, 64b of the brake disc 42a can specify the diameter 44 and/or a ventilation and/or an air supply for regulating a thermal stress.

When providing the data record 52 and/or the user-specific braking profile 54 for the external evaluation means 18b, user-related data of the corresponding user of the motor vehicle 10 can be transmitted in pseudonymized and/or anonymized form in order to be able to meet data protection requirements in particular.

Figure 2:
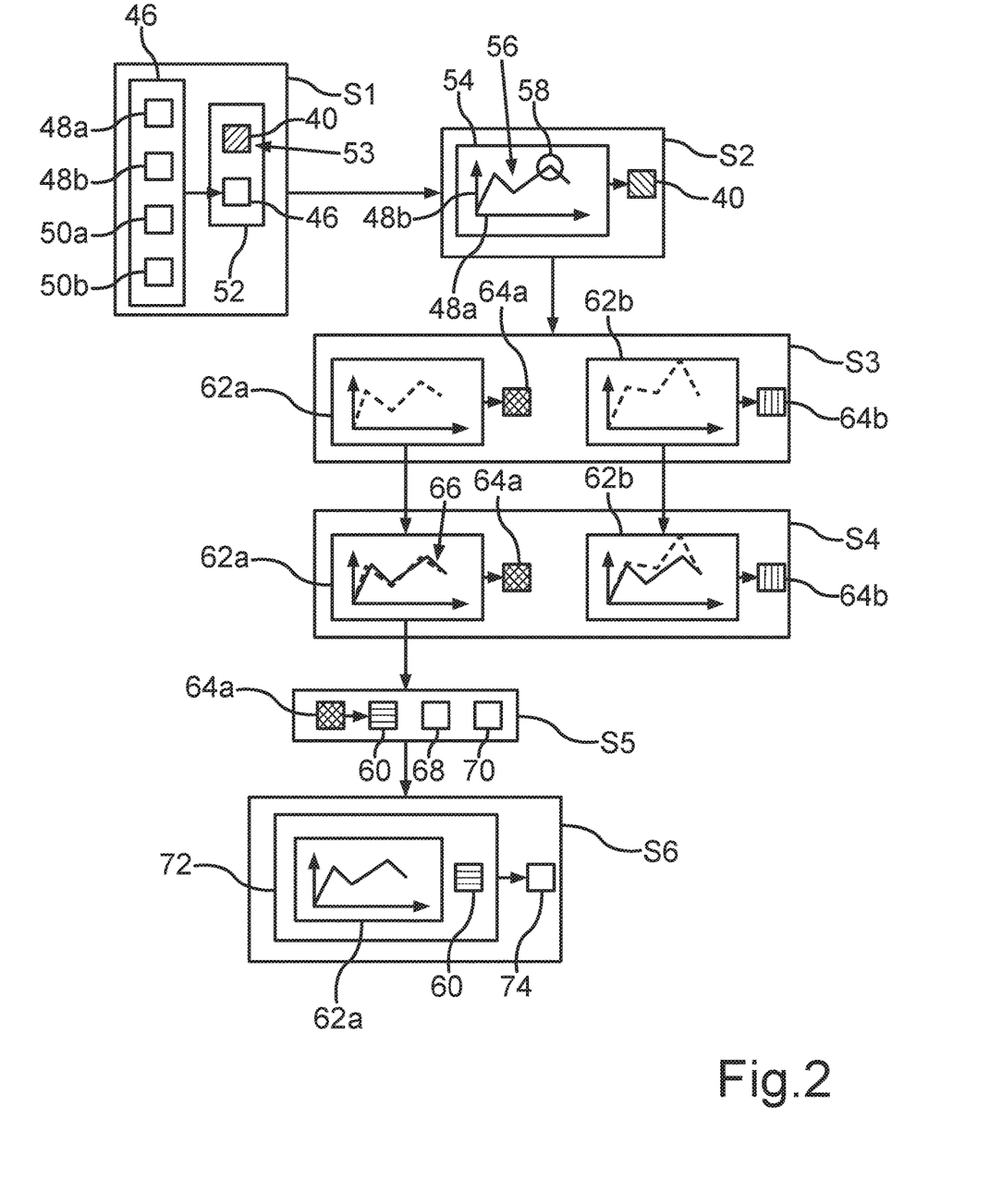
FIG. 2 is a schematic representation of a sequence of a method for determining a user-specific configuration of a braking device of the motor vehicle.

A method for determining the user-specific configuration 60 of the braking device 14 is explained schematically in FIG. 2. In a first step S1 of the method, measurement data 46 are determined by means of the detection unit 16 and the data record 52 is provided, the user-specific braking profile 54 being determined and provided based on the data record 52 in a second step S2 of the method. In a third step S3 of the method, possible braking profiles 62a, 62b are provided, which are taken into account when recognizing that possible braking profile 62a with the highest degree of conformity 66 and when identifying the associated configuration 64a as the user-specific configuration 60 in a fourth step S4 of the method. In a fifth step S5 of the method, a changeover operation is triggered, wherein in a sixth step S6 of the method an output content 72 can be output and a user input 74 can be detected as a reaction to the output of the output content 72.

The user-specific configuration 60 of the braking device 14 of the motor vehicle 10 can thus be determined based on the user-specific use of the current configuration 40 of the braking device 14.

The present disclosure is based on the knowledge that an individual recommendation for retrofitting the brakes, i.e. the change from the current configuration 40 to the user-specific configuration 60 of the braking device 14, can be derived based on a usage behavior of a driver of the motor vehicle 10, i.e. a customer or the vehicle driver. At the moment, no information (data record 52) regarding the usage behavior of a customer flows into a sale of the braking device 14 or the at least one mechanical component 42 A, 42 B of the braking device 14. Furthermore, automobile manufacturers (vehicle manufacturer 36) lack information (data record 52) in order to be able to offer the customer fitting, i.e. suitable brakes (braking device 14), in particular for retrofitting brakes, based on their specific usage behavior. Based on vehicle data and parts data (data record 52), conclusions can be drawn about the specific usage behavior. In this way, for example, the very sporty driver can be determined who would benefit directly from a larger and more ventilated brake (braking device 14).

This results in the advantage for automobile manufacturers (vehicle manufacturer 36) that the brake disc 42a and the brake linings 42b are recommended individually and thus a potential increase in sales can be achieved through the sale of larger brakes (braking device 14). Collected information (data record 52) can be sold to brake suppliers (vehicle component manufacturers 38), who in turn can draw conclusions for their own development activities. Furthermore, there is the advantage for the customer that he can receive information about his own driving behavior (user-specific braking profile 54). In addition, an increase in safety can be achieved by installing suitable brakes (braking device 14) on the basis of a determined progressive driving style, thereby reducing the risk of overheating.

To determine the user-specific configuration 60 of the braking device 14, sensor data (measurement data 46) are collected in the vehicle (motor vehicle 10), which data provide information about a specific use of the brakes (braking device 14), for example a brake temperature and/or an applied brake pressure (first measurement variable 48a). The data (data record 52) can then be transmitted to a backend (server unit 34) via a vehicle-internal communication module (communication unit 28*a*). The available data (data record 52) can be analyzed in order to be able to draw conclusions about a usage profile (user-specific braking profile 54). For example, a temperature profile (characteristic curve 56) determined using a temperature sensor (detection unit 16) can provide information on whether overheating events 58 have occurred above average. Based on this, the underlying algorithm would suggest the use of the brake disc 42*a*, which allows for better heat dissipation. An analysis result (user-specific braking profile 54 and user-specific configuration 60) can be displayed to the customer via a front end (output unit 22*a*, 22*b*), for example an app. If necessary, this can be combined with a direct appointment with the dealer. Furthermore, the analysis result of the vehicle use or part use (user-specific braking profile 54 and current configuration 40) can be displayed to a brake manufacturer (vehicle component manufacturer 38) in a dashboard (instrument panel). This provides information about the use of the parts installed in the vehicle (motor vehicle 10) (at least one component 42*a*, 42*b*) and offers the brake manufacturer (vehicle component manufacturer 38) the opportunity to incorporate the data (data record 52) into a development. However, one sale can also be implemented directly to the customer via a platform provided by the vehicle manufacturer 36 in order to be able to offer him a better set-up (user-specific configuration 60).

Overall, the examples show how the present disclosure can provide an individual recommendation for retrofitting the brake, i.e. the user-specific configuration 60 of the braking device 14, based on the driver's usage behavior.

The invention claimed is:

1. A method for determining a user-specific configuration of a braking device of a motor vehicle, the method comprising:
    detecting measurement data using a detector, wherein the measurement data describe a user-specific use of a current configuration of the braking device of the motor vehicle;
    providing a data record to an evaluation circuitry, wherein the data record comprises the measurement data and identification data for identifying the current configuration of the braking device;
    determining, using the evaluation circuitry, a user-specific braking profile based on the data record;
    providing a plurality of braking profiles to the evaluation circuitry, wherein each braking profile of the plurality of braking profiles is associated with a corresponding alternative configuration of the braking device that can be implemented in the motor vehicle;
    identifying, using the evaluation circuitry, a selected braking profile from the plurality of braking profiles, wherein the selected braking profile has a greatest degree of conformity with the user-specific braking profile;
    identifying the corresponding alternative configuration that is associated with the selected braking profile;
    setting the identified corresponding alternative configuration as the user-specific configuration; and
    triggering a changeover operation using the evaluation circuitry to provide the user-specific configuration to the motor vehicle,
    wherein the user-specific configuration of the braking device comprises at least one mechanical component.

2. The method according to claim 1, wherein triggering the changeover operation comprises changing the at least one mechanical component, wherein changing the at least one mechanical component comprises carrying out an intervention into an operation of the motor vehicle or a query into providing the at least one mechanical component prior to the changing of the at least one mechanical component,
wherein, when carrying out the intervention into the operation of the motor vehicle, at least one control parameter of the motor vehicle is adapted and at least one component of the motor vehicle is deactivated, and
wherein, when carrying out the query into providing the at least one mechanical component, an availability of the at least one mechanical component is sent to a manufacturer of the at least one mechanical component.

3. The method according to claim 1,
wherein triggering the changeover operation comprises sending, using a transmitter-receiver, an output content that represents the user-specific braking profile and the user-specific configuration for a user of the motor vehicle,
wherein the transmitter/receiver is integrated in one of the motor vehicle or part of a mobile terminal, and
wherein a user input in response to the output content is detected.

4. The method according to claim 1,
wherein a thermal stress on the braking device is caused by one of the current configuration of the braking device, the corresponding alternative configuration associated with each of the plurality of braking profiles of the braking device, or the user-specific configuration of the motor vehicle,
wherein a current thermal stress on the braking device is represented by one of the user-specific braking profile or the plurality of braking profiles, and
wherein triggering the changeover operation comprises replacing the current configuration of the braking device with the user-specific configuration of the motor vehicle such that the current thermal stress on the braking device is reduced.

5. The method according to claim 1,
wherein detecting the measurement data comprises detecting at least a first measured variable and a second measured variable,
wherein the first measured variable is one of a temperature value or a pressure value,
wherein the second measured variable is a time unit, and
wherein determining the user-specific braking profile comprises generating a current characteristic curve using the first measured variable and the second measured variable, the current characteristic curve being generated based on identifying at least one overheating event.

6. The method according to claim 1,
wherein detecting the measurement data comprises detecting a curvature and gradient of a lane section on which the motor vehicle is driven,
wherein a characteristic of the lane section influences the user-specific use of the current configuration of the braking device,
wherein the characteristic of the lane section is determined based on the curvature and the gradient of the lane section, and
wherein the characteristic of the lane section is provided as part of the user-specific braking profile.

7. The method according to claim 1,
wherein the evaluation circuitry is connected to the motor vehicle and comprises an internal evaluator located in the motor vehicle and an external evaluator located in a server unit,
wherein the server unit is one of a vehicle manufacturer or a vehicle component manufacturer,
wherein providing the data record and the user-specific braking profile to the external evaluator comprises transmitting user-related data of a corresponding user of the motor vehicle in pseudonymized form.

8. A motor vehicle, comprising:
a braking device comprising at least one mechanical component configured in a user-specific configuration, the braking device configured to perform operations comprising:
   detecting measurement data using a detector, wherein the measurement data describe a user-specific use of a current configuration of the braking device of the motor vehicle;
   providing a data record to an evaluation circuitry, wherein the data record comprises the measurement data and identification data for identifying the current configuration of the braking device;
   determining, using the evaluation circuitry, a user-specific braking profile based on the data record;
   providing a plurality of braking profiles to the evaluation circuitry, wherein each braking profile of the plurality of braking profiles is associated with a corresponding alternative configuration of the braking device that can be implemented in the motor vehicle;
   identifying, using the evaluation circuitry, a selected braking profile from the plurality of braking profiles, wherein the selected braking profile has a greatest degree of conformity with the user-specific braking profile;
   identifying the corresponding alternative configuration that is associated with the selected braking profile;
   setting the identified corresponding alternative configuration as the user-specific configuration; and
   triggering a changeover operation using the evaluation circuitry to provide the user-specific configuration to the motor vehicle,
   wherein one of the current configuration of the braking device, the corresponding alternative configuration associated with each of the plurality of braking profiles of the braking device, or the user-specific configuration of the motor vehicle predefine a configuration of a brake disc and a brake lining of the braking device.

9. The motor vehicle according to claim 8, wherein the predefined configuration of the brake disc comprises one of a diameter, a ventilation, or an air supply for regulating a thermal stress on the brake disc.

10. A non-transitory computer-readable storage medium storing a program code with instructions that, when executed by a processor, cause the processor to perform operations comprising:
   detecting measurement data using a detector, wherein the measurement data describe a user-specific use of a current configuration of a braking device of a motor vehicle;
   providing a data record to an evaluation circuitry, wherein the data record comprises the measurement data and identification data for identifying the current configuration of the braking device;
   determining, using the evaluation circuitry, a user-specific braking profile based on the data record;
   providing a plurality of braking profiles to the evaluation circuitry, wherein each braking profile of the plurality of braking profiles is associated with a corresponding alternative configuration of the braking device that can be implemented in the motor vehicle;
   identifying, using the evaluation circuitry, a selected braking profile from the plurality of braking profiles, wherein the selected braking profile has a greatest degree of conformity with the user-specific braking profile;
   identifying the corresponding alternative configuration that is associated with the selected braking profile;
   setting the identified corresponding alternative configuration as the user-specific configuration; and
   triggering a changeover operation using the evaluation circuitry to provide the user-specific configuration to the motor vehicle,
   wherein the user-specific configuration of the braking device comprises at least one mechanical component.

* * * * *